United States Patent [19]

Bolza

[11] 3,919,015

[45] Nov. 11, 1975

[54] GELLED WATER-BEARING EXPLOSIVE AND PROCESS

[75] Inventor: Frederick Bolza, Hawthorn East, Australia

[73] Assignee: ICI Australia Limited, Melbourne, Australia

[22] Filed: Aug. 13, 1973

[21] Appl. No.: 387,615

[30] Foreign Application Priority Data

Sept. 7, 1972 Australia................ 359/72

[52] U.S. Cl............. 149/42; 149/43; 149/44; 149/60; 149/61; 149/76; 149/85
[51] Int. Cl.²................................ G06B 33/06
[58] Field of Search........... 149/42, 44, 76, 85, 60, 149/61

[56] References Cited

UNITED STATES PATENTS 3,451,868   6/1969   Peterson................ 149/44 X

*Primary Examiner*—Stephen J. Lechert, Jr.
*Attorney, Agent, or Firm*—Cushman, Darby & Cushman

[57] ABSTRACT

A stable gelled water bearing explosive composition comprising a water-soluble inorganic oxygen-releasing salt, a fuel, water and a gum selected from the group consisting of galactomannans and xanthans is prepared by cross-linking the gum in situ at a pH of 3–8 with a soluble cross-linking agent selected from at least one of the group consisting of the compounds of elements of atomic number 58, 59, 60 and 62–71.

14 Claims, No Drawings

GELLED WATER-BEARING EXPLOSIVE AND PROCESS

This invention relates to a process for gelling aqueous solutions or dispersions of polymeric materials. More particularly this invention relates to a process for making water bearing gels comprising gums such as galactomannans or biopolymeric materials produced by a process comprising the microbial transformation of carbohydrate material and to certain products obtained thereby, including explosives.

Hydrophilic vegetable gums have been articles of commerce for hundreds of years. These natural gums constitute a class of organic substances structurally related to the sugars and carbohydrates. They have the characteristic property of forming viscous colloidal solutions (sols) or mucilages in water, either by dissolving, i.e., dispersing uniformly, in the water or by absorbing many times their own volume of water. A wide range of solution or sol properties can thus be obtained by use of different gums under a variety of conditions. The properties of the hydrophilic gums, especially in solutions, make them extremely valuable in manufacturing processes. Wide applications for the gums have been found in explosives technology, in the textile, cosmetic, pharmaceutical, and food industries, and to a lesser extent, in other industries.

Addition of the gums, even in very low concentrations, to solutions can cause remarkable increases in viscosity, and relatively speaking, a further slight increase in the gum concentration will often give a gel structure. The viscosity-building, or thickening, action of the gums in aqueous systems may be all that is desired at times, whereas in other circumstances, a substantial immobilization of the waterbearing composition by formation of a gel is desired. Gel formation is particularly desirable when undissolved solids are present in a system and must be maintained in a relatively uniform state of dispersion therein, even after removal from the mixer or other dispersing device.

As used herein, a gel is a mixture, one component of which is water, homogeneous down to substantially colloidal dimensions and capable of resisting a finite shearing force. This resistance to shearing is evidence of some sort of continuous mechanical network or structure which, however, can constitute a relatively small fraction of the total mass of the composition of which the gel is a component. Thus, the gel forms a matrix in which both dissolved and undissolved components can be distributed. Simply cooling a gum solution prepared at elevated temperatures, or increasing the concentration of the dissolved or dispersed gum, may lead to gel formation. Such gels, however, often have relatively low practical utility because they are physically weak and tend to rupture and crumble, or because gel formation is reversible with increases in temperature, or because the gel structure collapses in the presence of other components in the mixture, especially in the presence of dissolved electrolytes. Further, the increased concentration of relatively expensive gum which is required to obtain a greater degree of immobility of the aqueous system often imposes a substantial economic penalty on the resulting composition.

Galactomannans constitute one of the industrially important classes of gums, of which locust bean gum and guar gum are the most important members. Other suitable galactomannan gums which may be mentioned include those from the endosperms of seeds of other leguminous plants such as the sennas, brazilwood, tara, honey locust, paloverde, and rattlebox, alfalfa gum, clover gum, and fenugreek gum. In present commerce, however, the most important galactomannan gums are locust beam gum and guar gum. Locust bean gum is milled endosperm of the seeds of the leguminous plant, *Ceratonia siliqua*. It is marketed under a variety of other names, including Carob gum, gum Gatto, gum Hevo, Jandagum, Lakoegum, Rubigum, Lupogum, Luposol, gum Tragon, Trafarab, and Tragasol. Guar gum, on the other hand, generally is identified as such. It is milled endosperm from the seeds of the plant *Cyamopsis tetragonolobus*, also of the family Leguminosa. In addition to these natural gums referred to above certain other synthetic gums suitable for the preparation of water bearing gels have become available recently. From amongst such synthetic gums there may be mentioned the so-called biopolymeric materials or xanthan gums which are produced by a process comprising the microbial transformation of carbohydrate material. These xanthan gums may be prepared for example by reacting a carbohydrate with a microorganism to obtain a polymeric material which differs fundamentally from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Since such carbohydrates need not be in a refined state, many crude products having a high carbohydrate concentration may be utilized. Amongst suitable materials there may be mentioned raw sugar, crude molasses and the like. Microorganisms suitable for effecting the microbial transformation of carbohydrates may be for example plant pathogenic bacteria such as plant pathogens which produce exudates at the site of lesions on infected plants. Typical of such microorganisms are the species of the genus Xanthomonas. Thus for example a heteropolysaccharide may be prepared from glucose by the plant pathogen *Xanthomonas campestris* to give a product comprising D-mannose, D-glucose and D-glucoronic acid as the potassium or sodium salt. Similarly extracellular polysaccharides of a similar structure to the above may be prepared from glucose or sucrose by the plant pathogenic microorganisms *Xanthomonas oryzae* or *Xanthomonas phaseoli*. It is of interest to note that the polysaccharide from *X. oryzae* resembles that from *X. campestris* since both contain combined pyruvic acid. Although the structural significance of the pyruvic acid in these polysaccharides is obscure, it appears to be present as a ketal group, as in the case of red seaweed polysaccharides. Amongst other species of organisms of the genus Xanthomonas from which suitable biopolymers may be prepared there may be mentioned *X. malvacearum; X. translucens f. sp. hordeiavenae; X. translucens f. sp. undulosa; X. carotae; X. hederae; X. papavericola; X. incannae; X. vesicatoria; X. begoniae* and *X. vasculorium*. Biopolymers may also be produced from organisms other than those of the genus Xanthomonas. Thus there may be mentioned amongst the bacterial polysaccharides the dextran produced by *Leuconostoc mesenteroides* and related species, and the glucosan produced by *Agrobacterium tumefaciens*. A biopolymer or xanthan gum typical of those suitable for use as a gellable gum is the material known as "Biopolymer" XB23 (Registered Trade Mark) available commercially from General Mills Inc. of Minneapolis, Minnesota, U.S.A. This material comprises a biopolymeric material derived from a polymer which has been reacted with *X. campestris*. Another suitable material is the water soluble polymer known as XC polymer available commercially from Esso Production Research Co. of Houston, Texas, U.S.A. This polymer is produced by the action of bacteria of the genus Xanthomonas on carbohydrates to give a biopolymer of a very complex chemical structure. These naturally occurring gums and biopolymeric materials have a high tolerance for dissolved electrolytes and produce high-viscosity systems in water and in salt solutions, but gelation of solutions or sols of such gums occurs only at relatively high concentrations of galactomannan. As a consequence, crosslinking agents are used to hasten the formation of gels, to form gels at relatively low gum concentrations, and to form gels having properties not obtainable by the use of the gums alone. Many such crosslinking agents are known and from amongst these there may be mentioned, for example, zinc chromate, sodium dichromate, borax and potassium antimony tartrate. Such agents have been used in the preparation of ammonium nitrate - containing blasting explosives. Such blasting explosives have a body or consistency which makes them resistant to dispersion by water and also facilitates their handling and loading. Additionally, such crosslinked blasting agents are economical and safe to use, and have better storage properties, that is, they retain their favourable physical properties for a considerably longer period of time, than do similar compositions which are made thicker simply by increasing the concentration of gum without addition of a crosslinking agent.

Experience in the use of such crosslinked gels has shown however, that the gels will degrade under adverse conditions of storage, for example at 100°F., even when protected from loss of water by evaporation. Deterioration in storage is even more apparent in the gels containing high concentrations of electrolytes such as the ammonium nitrate-containing blasting agent compositions referred to hereinbefore.

It has also been proposed to prepare water-bearing gels containing galactomannans wherein the galactomannan is gelled by means of a crosslinking agent selected from compounds of transition metals of atomic number 21 to 26 inclusive, 39 41 inclusive, 57, 72 and 73. However, the use of a base in combination with such transition metal compounds is critical for the preparation of gels by this method. Without base, compounds of only a few of the transition metals of the aforementioned group, namely vanadyl, titanium and zirconyl compounds will cause any crosslinking to occur in the aqueous galactomannan solutions. However, compounds of these metals alone do not produce extensive gelation unless they are used in high concentrations. In addition to being less economically attractive, such high concentrations of crosslinking agent can cause degradation of the gel structure or other undesirable side reactions. Furthermore, unless base is present, wide variations in the extent and rate of crosslinking may occur, so that reproducible control of the process using the abovementioned transition elements becomes very difficult.

We have now found that certain compounds of the socalled rare earths may be used in the absence of base to form stable aqueous gels of galactomannans or biopolymeric materials. We have also found that by suitable choice of the rare earth compound and the concentration at which it is used the rate of gelation of galactomannans or biopolymeric material and the consistency of the gels obtained thereby may be controlled readily and thus we provide gels having a wide spectrum of utility.

Accordingly we provide a process for the gelation of gums selected from the group consisting of galactomannans and xanthans which process comprises mixing water, gum and crosslinking agent selected from at least one of the group consisting of the compounds of elements of atomic number 58 to 60 inclusive and 62 to 71 inclusive. The elements set out above are often referred to as being members of the lanthanide series. However, the group as defined above is one in which the 4 f orbitals are being filled. Since lanthanum lacks 4 f electrons this element is excluded from the crosslinking agents of our invention. We prefer to use compounds of cerium as crosslinking agents since such compounds are comparatively cheap and more readily available than other members of the group. However, other members of the group are useful although less preferred since thay are usually less readily available and more expensive than cerium. It will be appreciated, since it is difficult to separate such elements one from another, that commercial compounds of elements of the group may be contaminated with quantities of other compounds of the group. It lies within our invention to use such contaminated compounds as crosslinking agents. Mixtures of our crosslinking agents may also be used in the process of our invention.

The amount of crosslinking agent used in our process may be varied widely dependent amongst other aspects on the nature of the crosslinking agent or agents used, the degree of crosslinking desired and the application in which the water-bearing gel is used. Useful gels are provided in our process by admixing crosslinking agent and gum in a ratio as low as 0.002 millimoles of crosslinking agent per gram of gum. However, the process is usually performed by providing the admixture of amounts of crosslinking agent and gum wherein there is used amounts in the range from 0.01 to 5 millimoles, preferably from 0.1 to 2.5 millimoles, of crosslinking agent per gram of gum. The nature of the functional group associated with the crosslinking element is not narrowly critical and a wide range of compounds may be used. Thus for example suitable crosslinking agents include salts such as ammonium ceric nitrate, ammonium cerous nitrate, ammonium cerous sulphate, ceric sulphate, cerous acetate, cerous bromate, cerous bromide, cerous chloride, cerous iodide, cerous nitrate, cerous selenate, cerous sulphate, dysprosium chloride, erbium sulphate, europic nitrate, europous chloride, gadolinium dimethyl phosphate, gadolinium acetate, holmium chloride, lutetium sulphate, neodymium nitrate, praseodymium chloride, samarium chloride, terbium sulphate, thulium chloride, or ytterbium chloride. Some crosslinking may also be achieved with less soluble compounds than those listed above, for example cerium oxide, cerium carbonate, praseodymium oxide, praseodymium oxalate, neodymium oxide, neodymium carbonate, samarium oxide, europium oxide, or gadolinium oxide provided there is sufficient water in the reaction medium to dissolve at least part of the compound therein. Such less soluble compounds are suitable when it is desired to form a gel over a prolonged period of time. They are, for most purposes, less preferred than the more soluble compounds enumerated above.

The process of our invention as hereinbefore described may be performed in several ways. For example a premix of gum or gums and crosslinking agent or agents may be added to water to cause gelation. In another and preferred embodiment of our invention the gum or gums may be given a hydration treatment prior to admixing the gum component with the crosslinking component. By hydration is meant the association of water molecules with gum molecules that occurs when a gum is uniformly dispersed in an aqueous system. Such hydration, which is accompanied by swelling of the gum should not be confused with the crosslinking tht takes place in the instant process. Incorporation of crosslinking agents into aqueous systems containing prehydrated gum in accordance with the present invention produces gelled products that not only have higher viscosities than are obtainable by hydration of gum alone, but also, because of the occurrence of crosslinking therein, have advantageous characteristics not achievable by increases in viscosity alone. These characteristics, which include, for example, a high degree of cohesiveness and prolonged resistance to degradation at elevated temperature to segregation of components and to ingress of additional water, will be more appreciated as the invention is further described. In a further embodiment of our process our crosslinking agents may be introduced into the aqueous gelation systems predissolved in water to facilitate dispersion and mixing. In cases where the compounds inherently have relatively low solubility in water, solubility advantageously may in some instances be increased if desired by introducing these compounds in an aqueous solution to which a small amount of mineral acid, for example nitric acid, sulphuric acid or hydrochloric acid has been added.

Our process is useful for the preparation of aqueous gelation systems comprising varying amounts of gellable gums. The proportion of such gellable gums in such systems will depend to a large extent on the application for which the system is to be used. Suitable gelation is obtained when the gum component comprises from 0.1 to 5% w/w of the system although systems containing 10% w/w or more of the gum component can be used. However, for most applications satisfactory systems are obtained when the gum component comprises from 0.3 to 3% w/w of such water-bearing gels.

The process of this invention can be performed with the aforementioned gums, water and rare earth compound crosslinking agents as the sole constituents of the reaction mixture. In such instances the process of this invention and the products obtained thereby find utility for example, in sizing of textiles and papers and in drilling muds. However, in these as well as in other applications, the reaction mixture can also contain other dispersed or dissolved ingredients such as other crosslinking agents already known in the art as being useful for crosslinking gums, for example, sodium dichromate, potassium antimony tartrate, sodium borate and the like. Whilst the compounds used in the process of our invention are very satisfactory as crosslinking agents in aqueous media which are substantially neutral, i.e., when the pH of the system is about 7, they are also effective in acidic or basic aqueous media. Thus for certain systems they are useful when the pH of the system lies in the range from 2.5 to 8. For other systems gelled gums having excellent resistance to leaching by water may be obtained when the pH of the system is less than 8 say in the range from 4 to 6. The reaction mixture may also contain other dispersed or dissolved ingredients. Thus, the process of this invention finds particular utility in making explosive compositions such as gelled aqueous blasting agents. Such compositions may be prepared by our process such that the degree of gelation may be varied to produce compositions ranging from pourable or pumpable slurries to firm gels which on standing become increasingly firm.

In general, aqueous blasting agents prepared in accordance with this invention may be described as stable, gelled water-bearing explosive compositions comprising at least one water soluble inorganic oxygen releasing salt; water; at least one fuel; at least one gum selected from the group consisting of galactomannans and xanthans; and crosslinking agent selected from at least one of the group consisting of the compounds of the elements of atomic number 58 to 60 and 62 to 71 inclusive. In general, except for the gel matrix, such water-bearing explosives are of conventional types.

The oxygen releasing salts suitable for use in explosive compositions made by our process are of the conventional types used in explosive compositions. Thus they may be, for example, inorganic nitrates, chlorates and perchlorates and mixtures thereof. We prefer that the oxygen releasing salt material be chosen from the nitrates of the alkali and alkaline earth metals or ammonium and of these we prefer sodium nitrate and ammonium nitrate. The amount of oxygen releasing salt in such compositions is not narrowly critical; we have found that compositions containing amounts of oxygen releasing salts from 50% w/w to 90% w/w of the total composition are satisfactory and amounts from 65% w/w to 85% w/w are preferred. The particle size and shape of the oxygen releasing salt is not critical and is well known from the art of ammonium nitrate manufacture; powders and prilled particles are satisfactory.

The proportion of water in such compositions should be sufficient to dissolve at least part of the oxygen releasing inorganic salt and at least part of any water soluble fuel which may be present, and also be sufficient to hydrate at least part, preferably all, of the gelling agent present. Suitably the amount of water present may constitute from % w/w to 35% w/w of the total composition, but the amount present should not be in excess of the explosive limit of the composition. We prefer that the water be in the range of 5% w/w to 25% w/w of the total composition and more preferably be in the range from 12% w/w to 17% w/w of the total composition.

When referring to fuels or fuel materials in this specification we mean substances which are stable in such explosive compositions, that is prior to detonation, during preparation and storage the substance is chemically inert to the system. The said substances must be combustible and their physical nature should be such that they may be incorporated in our compositions in a manner so as to be uniformly distributed throughout the compositions. Such fuels are well known in the art and they may be organic or inorganic and may also be derived from animals and plants.

The fuels employed in the compositions prepared by the process of this invention can be, for example, self-explosive fuels, non-explosive carbonaceous, non-metallic and metallic fuels or mixtures of the aforementioned types of fuels. They can be varied widely. Examples of self-explosive fuels include one or more organic nitrates, nitrocompounds and nitramines such as trinitrotoluene, cyclotri (or tetra) methylenetri (or tetra)

nitramine, tetryl, pentaerythritol tetranitrate, explosive grade nitrocellulose and nitrostarch.

The self-explosive fuel can be for example in any of the well known flake, crystalline or pelleted forms. In general up to 35% and preferably from 10 to 30% by weight based on the weight of composition of self-explosive fuel may be used.

Suitable water soluble fuels are organic water soluble substances for example urea, carbohydrates such as sugars or molasses, water soluble alcohols or glycols, glues or mixtures of these. Suitably the proportion of water soluble fuel in our compositions is in the range from 0.8% w/w to 8% w/w of the total composition. Amounts from 4% w/w to 7% w/w of the total composition are preferred.

Suitable water insoluble or sparingly water soluble fuels may be chosen from inorganic materials for example sulphur, aluminium, silicon, ferrosilicon, ferrophosphorus, magnesium, titanium, boron, mixtures thereof for example mixtures of aluminium with ferrosilicon, or organic materials for example finely divided charcoal, anthracite, gilsonite asphalt, cellulosic materials such as sawdust, or cereal products for example flours, dextrins or starches. When the inorganic fuel is a metal it is preferably in granulated or powdered form ranging in particle size from coarse, for example retained on a 30 mesh sieve, to very fine for example passing a 325 mesh sieve. Such granulated or powdered metal may be in the form of discrete regular shaped particles, but metal powders wherein the metal is in the form of irregular shaped particles, or in flakes or in the form of aggregates of particles or flakes are also satisfactory. Preferred fuels are the metallic powders. The most preferred metallic fuel is aluminium. The proportion of water insoluble or sparingly water soluble non-metallic fuels in such compositions may suitably be in the range from 1% w/w to 10% w/w of the total composition and amounts from 4% w/w to 7% w/w of the total composition are preferred. The proportion of metallic water insoluble fuels when present in such compositions may be as high as 25% w/w and amounts in the range from 0.5% w/w to 20% w/w of the total compositions are preferred.

Where desirable, it is convenient to add to the slurry explosive compositions made according to the process of our invention, in amounts expressed as parts by weight per 100 parts by weight of the final mixture, other conventional additives used in slurry explosives. Such additives may include for example anti-foaming agents, for example ethyl hexanol, in amounts ranging e.g. from 0 to 0.1 part, surfactants, for example non-ionic surfactants such as alkylene oxide condensates of phenols or amides, from 0 to 5 parts. When desired, sensitizers in the form of gas or a mixture of gases such as air may be added to our compositions. Thus it may be added in the form of injected or stirred in air or gas or it may be added as air or gas encapsulated in or attached to the surface of particulate material. Alternatively a gas, such as nitrogen or carbon dioxide, may if desired be generated in the composition by known means. Yet again further sensitizers in the form of modified metallic powders may be added to the explosive compositions prepared by our process. Such modified metallic powders include for example the reaction product of aluminium powder with resin acids, rosin and derivatives thereof. It has also been observed that explosives compositions prepared by the process of our invention may be some instances be provided with enhanced water resistance properties and that the rate of gelation is increased if there is added to the reaction mixture an amount of a pH controlling agent such that the pH of the composition is in the range from 3 to 8, preferably from 4 to 6. From amongst suitable pH controlling agents there may be mentioned alkali metal salts such as sodium hydroxide.

In general, the explosive compositions of this invention may be prepared by the conventional formulating techniques used for preparing galactomannan or xanthan containing aqueous explosives excepting, of course, that the aforementioned rare earth compounds are used as crosslinking agents. Thus, for example, in explosive compositions the concentration of the aforementioned crosslinking agents may be as low as 0.002 millimoles of crosslinking agent per gram of gum. Preferably the concentration of the said crosslinking agents in such explosives compositions will provide from 0.01 to 2.5 millimoles of crosslinking agent per gram of gum, and more particularly from 0.1 to 1.0 millimoles of crosslinking agent per gram of gum. The proportion of gum component in the explosives composition is conveniently in the range from 0.1 to 5% w/w of the composition. Where a galactomannan, for example, guar gum, is used amounts in the range from 0.5 to 3% w/w of the composition are particularly convenient.

Considered as freshly made products the blasting compositions of the present invention do not differ appreciably in explosive properties from similar compositions of the prior art. However, greater variations in the rate of crosslinking and in the physical properties of the finished products are possible with the new compositions than with prior art compositions. Additionally the compositions obtained by the process of this invention are markedly superior to prior art compositions in resistance to degradation during storage, and in resistance to leaching of the components when the compositions are in contact with aqueous media, for example when in contact with water in a borehole when used in processes of blasting and have thus enabled improvements to be made in blasting processes. By means of the use of explosive compositions prepared by the process of our invention it is now possible to perform blasting operations in areas where hitherto, because of the presence of water in such areas, it has been difficult and often impossible to detonate explosive compositions of a similar type.

Our invention is now illustrated by, but in no way limited to, the following examples wherein all parts and percentages are expressed on a weight basis unless otherwise specified. Examples 14, 20 and 25 are included for the purposes of comparison and are not within our invention.

EXAMPLE 1

To 983 parts of water at room temperature and maintained in a state of vigorous agitation was added 6 parts of guar gum. The agitation was continued until the gum was uniformly dispersed and hydrated and no lumps and aggregates were present. To the resulting dispersion there was added a solution containing 1 part of ammonium ceric nitrate dissolved in 10 parts of water and this solution was added to and uniformly mixed into the dispersion. The resultant gel displayed excellent storage stability and gel strength and was resistant to syneresis over a period of seven days.

EXAMPLE 2

The general procedure of Example 1 was repeated but the guar gum of that Example was replaced by 12 parts of powdered locust bean gum. The resultant gel displayed excellent storage stability and gel strength and was resistant to syneresis.

EXAMPLE 3

The general procedure of Example 1 was repeated but the guar gum of that Example was replaced by 3 parts of "Biopolymer" XB 23. The resultant gel displayed excellent storage stability and gel strength and was resistant to syneresis.

EXAMPLES 4 TO 10 INCLUSIVE

Using the general procedure of Example 1 a series of stable gels were prepared using the ingredients set out in Table 1.

TABLE 1

| Example No. | Guar Gum Parts | Water Total Parts | Crosslinking agent | |
|---|---|---|---|---|
| | | | Type | Parts |
| 4 | 30 | 969 | Ceric sulphate | 1 |
| 5 | 15 | 984 | Ammonium ceric nitrate | 1 |
| 6 | 20 | 978 | Cerous chloride | 2 |
| 7 | 15 | 983 | Cerous carbonate* | 2 |
| 8 | 25 | 974 | Cerous sulphate | 1 |
| 9 | 20 | 978 | Cerous nitrate | 2 |
| 10 | 20 | 978 | Ammonium ceric sulphate | 2 |

*The cerous carbonate was dissolved in a small amount of hydrochloric acid prior to being admixed into the dispersion. The pH of the resultant gel was 5.

EXAMPLE 11

The general procedure of Example 1 was repeated, but the solution of ammonium ceric nitrate used in that Example was replaced by a dispersion of 3 parts of ceric oxide in water. Over a period of 14 days a gel was formed progressively. Although the gel so formed was stable on storage it was not as strong as the gel obtained in Example 1.

EXAMPLE 12

The general procedure of Example 1 was repeated, but the ammonium ceric nitrate of that Example was replaced by a mixture of 0.5 part of cerous chloride and 0.5 part of cerous sulphate. The resultant gel was similar to that obtained in Example 1.

EXAMPLE 13

A slurried blasting agent composition was prepared from the following components:

| | |
|---|---|
| Ammonium nitrate | 673 parts |
| Sodium nitrate | 30 parts |
| Aluminium powder | 100 parts |
| Guar gum | 6 parts |
| Sugar | 50 parts |
| Water | 140 parts |
| Ceric sulphate | 1 part |

A dry premix of the ammonium nitrate, sodium nitrate, aluminium powder and guar gum was prepared. To this premix there was added the sugar dissolved in 110 parts of water. The resultant mixture was agitated and admixed to a uniform mass during which time the guar gum became hydrated. A solution of the cerium sulphate in the residual water was added to the stirred mixture, and stirring was continued for a further 5 minutes. The resultant slurry explosive was stored over a period of 3 weeks and during this time no segregation of the components was observed. The resistance to leaching by water of the components from the composition was tested by the following procedure. An amount of the composition which had gelled for 24 hours and containing 10 gram of ammonium nitrate, in this instance approximately 14.9 gm, was placed in a mesh basket and suspended in 200 ml of water at room temperature. After 75 minutes the basket and its residual content was removed from the aqueous medium. The aqueous medium was then stirred until it was homogeneous and a 50 ml aliquot taken therefrom was analysed for its ammonium nitrate content. The above procedure was repeated with the gel after gelation had proceeded for each of 2 weeks and 3 weeks. The percentage of the ammonium nitrate retained in the treated composition, based on the original ammonium nitrate content was as follows:-

| | |
|---|---|
| After 24 hours gelation | 19% |
| After 2 weeks gelation | 15% |
| After 3 weeks gelation | 15% |

EXAMPLE 14

For the purposes of comparison the general procedure of Example 13 was repeated but the ceric sulphate used in that Example was replaced by 1 part of borax. The percentage of ammonium nitrate retained in this comparative composition was 14% after 24 hours gelation, 7% after 2 weeks gelation and 4% after 3 weeks gelation.

EXAMPLE 15

Using the general procedure of Example 1, 971 parts of water, 8 parts of guar gum and 0.5 part of cerous chloride dissolved in 10 parts of water were mixed together. As the viscosity of the mixture increased there was added to and admixed with the mixture a solution of 0.5 part of potassium antimony tartrate in 10 parts of water. The resultant gel displayed excellent storage stability and water resistance.

EXAMPLE 16

Using the general procedure of Example 15, 960 parts of water, 8 parts of guar gum, a solution of 0.5 part of ammonium ceric nitrate in 10 parts of water and 1 part of potassium antimony tartrate were mixed. A solution of 2 parts of sodium hydroxide in 10 parts of water was added to the mixture. A gel of excellent storage stability was formed rapidly. The pH of the mixture was 7.2.

EXAMPLE 17

Using the general procedure of Example 15, a gel was prepared by mixing 965 parts of water, 8.5 parts of guar gum, a solution of 0.5 part of ammonium ceric nitrate in 10 parts of water and a solution of 1 part of potassium antimony tartrate in 10 parts of water for 5 minutes. A solution of 0.05 part of sodium dichromate in 5 parts of water was then admixed with the above ingredients. A stable gel having good water resistance was formed.

EXAMPLE 18

The procedure of Example 17 was repeated but the sodium dichromate of that Example was replaced by 0.05 part of borax. A stable gel was formed.

EXAMPLE 19

The general procedure of Example 13 was repeated but the ceric sulphate of that Example was replaced by a mixture of 0.5 part of ceric sulphate and 1 part of potassium antimony tartrate. Additionally there was admixed into the composition 0.5 part of sodium hydroxide dissolved in 5 parts of water. The amount of water used to dissolve the sugar was reduced to 105 parts. Gelation was allowed to proceed for 2 weeks. After 3 days gelation a 15 gram portion of the gel was suspended in 200 ml of water at room temperature for 75 minutes. 17% of the original ammonium nitrate in the gel was retained after this treatment. Similar treatment of the gel after 1 week and 2 weeks gelation showed that 48 and 53% w/w respectively was retained after these periods of time.

EXAMPLE 20

For the purposes of comparison the general procedure of Example 19 was repeated but the ceric sulphate of that Example was replaced by 0.6 part of the prior art compound lanthanum chloride. The percentage of ammonium nitrate retained was 8% after 3 days and this value was unchanged after 2 weeks.

EXAMPLE 21

The general procedure of Example 13 was used to prepare a gelled slurry explosive composition from:

| | |
|---|---|
| Ammonium nitrate | 661 parts |
| Sodium nitrate | 30 parts |
| Aluminium powder | 100 parts |
| Guar gum | 6 parts |
| Sugar | 50 parts |
| Water | 140 parts | and a crosslinking agent. The crosslinking agent contained cerous chloride, potassium antimony tartrate and sodium dichromate in a molar ratio of 14 : 31 : 1 and the cerous chloride content of the composition was adjusted so that there was present $2.33 \times 10^{-4}$ molar parts of cerous chloride per part of guar gum. The percentage of ammonium nitrate retained in the composition after immersion of water is set out in Table 2.

TABLE 2

| Days after mixing | % w/w ammonium nitrate |
|---|---|
| 1 | 48 |
| 2 | 44 |
| 3 | 40 |
| 7 | 37 |
| 14 | 37 |
| 21 | 37 |

EXAMPLES 22 TO 24 INCLUSIVE

The general procedure of Example 21 was repeated but the crosslinking agent of that Example was replaced by a mixture of $5.16 \times 10^{-4}$ molar parts of potassium antimony tartrate per part of guar gum and a cerium comound as set out in Table 3. The explosive compositions so obtained had excellent water resistance as illustrated in Table 4 which sets out the percentage of ammonium nitrate retained in the composition after immersion in water following gelation times set out in Table 4.

TABLE 3

| Example No. | Cerium Compound | Molar parts of cerium compound per part of gum |
|---|---|---|
| 22 | Ceric sulphate | $4.0 \times 10^{-4}$ |
| 23 | Ammonium ceric nitrate | $3.0 \times 10^{-4}$ |
| 24 | Cerous chloride | $4.5 \times 10^{-4}$ |

EXAMPLE 25

For the purposes of comparison the general procedure of Examples 22 to 24 inclusive was repeated but the cerium compound of those Examples was replaced by borax which was present in the composition in an amount of $4.5 \times 10^{-4}$ molar parts per part of guar gum. The water resistance of this comparative composition is set out in Table 4.

TABLE 4

Water resistance of explosive compositions
% ammonium nitrate retained

| Days of Gelation | Example 22 | Example 23 | Example 24 | Comparative Example 25 |
|---|---|---|---|---|
| 1 | 22 | 19 | 18 | — |
| 2 | 30 | 28 | 27 | 14 |
| 3 | 35 | 35 | 35 | — |
| 7 | 43 | 48 | 48 | 25 |
| 14 | 47 | 47 | 46 | 42 |
| 21 | 48 | 46 | 45 | 41 |
| 42 | 41 | 45 | 44 | 12 |

EXAMPLE 26

A slurried blasting agent composition was prepared from the following components:

| | |
|---|---|
| Ammonium nitrate | 663 parts |
| Sodium nitrate | 30 parts |
| Coarse aluminium powder | 100 parts |
| Sugar | 50 parts |
| Water | 150 parts |
| Guar gum | 6 parts |
| Samarium chloride ($SmCl_3 6H_2O$) | 0.5 part |

A dry premix of the ammonium nitrate, sodium nitrate, aluminium powder and guar gum was prepared. To this premix there was added the sugar dissolved in 110 in parts of water. The resultant mixture was agitated and admixed to a uniform mass during which time the guar gum became hydrated. A solution of the samarium chloride in the residual water was added to the stirred mixture and stirring was continued for 5 minutes. When the resultant gelled product was tested after 24 hours storage for resistance to leaching by water by the procedure of Example 13 it was found that 20% of the ammonium nitrate was retained in the treated product.

EXAMPLE 27

The general procedure of Example 26 was repeated but the samarium salt of that composition was replaced by 0.5 part of dysprosium chloride ($DyCl_3 6H_2O$). A gelled product was obtained. When the product was tested for resistance to leaching by water after 7 days gelation it was found that 18% of the ammonium nitrate was retained in the treated composition.

EXAMPLE 28

The general procedure of Example 26 was repeated but the samarium salt of that composition was replaced by 1 part of ytterbium chloride ($YbCl_3 6H_2O$). A gelled product was obtained. When the product was tested for resistance to leaching by water after 4 weeks gelation it was found that 46% of the ammonium nitrate was retained in the treated composition.

EXAMPLE 29

The general procedure of Example 26 was repeated but the amount of samarium chloride was increased to 1 part and 0.1 part of potassium antimony tartrate was incorporated into the composition. A gelled product was obtained. When the product was tested for resistance to leaching by water after 4 weeks gelation it was found that 47% of the ammonium nitrate was retained in the treated composition.

EXAMPLE 30

A slurried blasting agent composition was prepared from the following components:

| | |
|---|---|
| Ammonium nitrate | 663 parts |
| Sodium nitrate | 30 parts |
| Coarse aluminium powder | 100 parts |
| Sugar | 50 parts |
| Water | 150 parts |
| "Biopolymer" XB23 | 6 parts |
| Potassium antimony tartrate | 0.8 part |
| Ceric sulphate | 0.8 part |

A dry premix of ammonium nitrate, sodium nitrate, aluminium powder and the xanthan gum (Biopolymer XB23) was prepared. To this premix there was added the sugar dissolved in 110 parts of water. The resultant mixture was agitated and admixed to a uniform mass during which time the gum became hydrated. The potassium antimony tartrate, ceric sulphate and residual water were then added to the stirred mixture and stirring was continued for a further 5 minutes. The resultant slurry explosive was stored over a period of 3 weeks and during this time no segregation of the components was observed. The gelled product was tested for resistance to leaching by water using the procedure of Example 13. The percentage of the ammonium nitrate retained in the treated composition was as follows:

| | |
|---|---|
| After 24 hours gelation | 41% |
| After 2 weeks gelation | 37% |
| After 3 weeks gelation | 32% |

EXAMPLE 31

The general procedure of Example 30 was repeated but the Biopolymer XB23 of that Example was replaced by 12 parts of locust bean gum. When the gelled product so obtained was tested for resistance to leaching by water after 3 weeks gelation it was found that 24% of the ammonium nitrate was retained in the composition.

EXAMPLE 32

A slurried blasting agent composition was prepared by mixing the following components:

| | |
|---|---|
| Ammonium nitrate | 648 parts |
| Sodium nitrate | 30 parts |
| Coarse aluminium powder | 100 parts |
| Sugar | 50 parts |
| Water | 150 parts |
| Guar gum | 20 parts |
| Potassium antimony tartrate | 1 part |
| Ceric ammonium nitrate | 1 part |

When the gelled product so obtained was tested for resistance to leaching by water by the procedure of Example 13 after gelling for 24 hours it was found that 36% of the ammonium nitrate was retained in the composition. After 2 weeks gelation a value of 29% was obtained for this property.

EXAMPLE 33

To a mixture of

| | |
|---|---|
| Ammonium nitrate | 613 parts |
| Sodium nitrate | 120 parts |
| Sulphur | 20 parts |
| Sugar | 50 parts |
| Coarse aluminium powder | 50 parts |
| Paint fine aluminium powder | 20 parts |
| Water | 120 parts |
| Guar gum | 5 parts |
| Potassium antimony tartrate | 0.8 part | there was added 0.8 part of a mixture of rare earths stated by the supplier, British Drug Houses of England, to consist of 50% of ceric sulphate together with other rare earth sulphates. A gelled product was obtained and during storage over 4 weeks the product became increasingly firm. When tested for resistance to leaching by water using the procedure of Example 13 after 24 hours gelation only 9% of the ammonium nitrate was retained in the composition. However after gelation for 1 week this value had increased to 50% and after 4 weeks this value was 47%.

EXAMPLE 34

A slurried blasting agent was prepared by mixing the following components:

| | |
|---|---|
| Ammonium nitrate | 610 parts |
| Sodium nitrate | 120 parts |
| Sulphur | 20 parts |
| Sugar | 50 parts |
| Coarse aluminium powder | 50 parts |
| Paint fine aluminium powder | 20 parts |
| Water | 125 parts |
| Guar gum | 4.5 parts |
| Potassium antimony tartrate | 1.6 parts |
| Ceric ammonium nitrate | 1.5 parts |

The resultant gelled product was transferred to cylindrical paper cartridges of 1 inch diameter. The cartridges were detonated successfully using one No. 6 copper detonator.

EXAMPLE 35

A slurried blasting agent was prepared by mixing the following components:

| | |
|---|---|
| Ammonium nitrate | 620 parts |
| Sodium nitrate | 100 parts |
| Sugar | 50 parts |
| Atomized aluminium powder | 80 parts |
| Paint fine aluminium powder | 20 parts |
| Ethylene glycol | 4 parts |
| Guar gum | 6 parts |
| Water | 120 parts |
| Potassium antimony tartrate | 5 parts |
| Ammonium ceric nitrate | 6 parts |

To the resultant blend of materials there was added sufficient sodium hydroxide in the form of a 20% aqueous solution to produce a composition having a pH of 3.2. The gelled composition so obtained was stored for 2 weeks. When the composition was tested for resistance to leaching by water after this time using the procedure of Example 13 it was found that 29% of the ammonium nitrate was retained in the composition.

EXAMPLE 36

The procedure of Example 35 was repeated but in the present example the pH of the composition was adjusted to 4.1. 50% of the ammonium nitrate was retained in an aliquot of the composition when it was tested for resistance to leaching by water.

EXAMPLE 37

The procedure of Example 35 was repeated but in the present example the pH of the composition was adjusted to 5.7. 53% of the ammonium nitrate was retained in an aliquot of the composition when it was tested for resistance to leaching by water.

I claim:

1. In the process for gelling water-bearing explosive compositions containing gum selected from the group consisting of galactomannans and xanthans with crosslinking agents in situ, the improvement which comprises incorporating in the reaction mixture crosslinking agent selected from at least one of the group consisting of the compounds of elements of atomic number 58 to 60 inclusive and 62 to 71 inclusive, said crosslinking agent being soluble in the system and being present in an amount from 0.002 to 2.5 millimoles per gram of gum, said gelation being conducted at a pH from 3 to 8.

2. A process according to claim 1 wherein said crosslinking agent is present in an amount from 0.1 to 1.0 millimole per gram of gum.

3. A process according to claim 1 wherein said gelation is conducted at a pH from 4 to 6.

4. A process according to claim 1 wherein said crosslinking agent comprises a compound of cerium wherein the valency of cerium is 4.

5. A process according to claim 4 wherein said crosslinking agent is ceric ammonium nitrate and said gum is guar gum.

6. A process according to claim 1 wherein said crosslinking agent comprises a compound of cerium wherein the valency of cerium is 4 and wherein said gum comprises a biopolymeric material derived from a polymer which has been reacted with *Xanthomonas campestris*.

7. A process according to claim 1 wherein said crosslinking agent is selected from the group consisting of samarium chloride, dysprosium chloride and ytterbium chloride and wherein said gum is guar gum.

8. A process according to claim 1 comprising in addition the admixture of at least one further crosslinking agent selected from the group consisting of alkali metal dichromates, alkali metal borates and potassium antimony tartrate.

9. A stable, gelled, water bearing explosive composition comprising firstly at least one oxygen releasing salt selected from the group consisting of ammonium nitrate, chlorate and perchlorate, alkali metal nitrates, chlorates and perchlorates, and alkaline earth metal nitrates, chlorates and perchlorates present in an amount from 50 to 90 parts; secondly water present in an amount from 5 to 25 parts; thirdly at least one fuel material selected from the group consisting of water soluble fuel present in an amount from 0.8 to 8 parts, non-metallic sparingly water soluble fuel and non-metallic water insoluble fuel present in an amount from 1 to 10 parts and metallic water insoluble fuel present in an amount from 0.5 to 20 parts; fourthly from 0.1 to 5 parts of at least one gum selected from the group consisting of galactomannans and xanthans crosslinked in situ at a pH from 3 to 8 with crosslinking agent selected from at least one of the group consisting of the compounds of the elements of atomic number 58 to 60 inclusive and 62 to 71 inclusive, said crosslinking agent being soluble in the system and being present in an amount from 0.002 to 2.5 millimoles per gram of said gum, all parts being in parts by weight per 100 parts by weight of the composition.

10. A composition according to claim 9 wherein the oxygen releasing salt is selected from the group consisting of ammonium nitrate and sodium nitrate.

11. A composition according to claim 9 wherein the oxygen releasing salt constitutes from 65% to 85% by weight of the composition.

12. A composition according to claim 9 wherein water constitutes from 12% to 17% by weight of the composition.

13. A composition according to claim 9 wherein there is present from 0.5 to 3% by weight of guar gum crosslinked in situ at a pH from 4 to 6 with crosslinking agent selected from the compounds of cerium wherein the valency of cerium is 4 and wherein said crosslinking agent is present in an amount from 0.1 to 1.0 millimole per gram of said gum.

14. A stable, gelled, water bearing explosive composition comprising at least one water-soluble inorganic oxygen releasing salt; at least one fuel; from 5 to 35% by weight of water; and from 0.1 to 5% by weight of at least one gum selected from the group consisting of galactomannans and xanthans crosslinked in situ at a pH from 3 to 8 with crosslinking agent selected from at least one of the group consisting of the compounds of elements of atomic number 58 to 60 inclusive and 62 to 71 inclusive, said crosslinking agent being soluble in the system and being present in an amount from 0.002 to 2.5 millimoles per gram of said gum.

* * * * *